US010900421B2

(12) United States Patent
Hahn

(10) Patent No.: US 10,900,421 B2
(45) Date of Patent: Jan. 26, 2021

(54) DIRECT FEEDBACK REGARDING METERED FLOW OF FUEL SYSTEM

(71) Applicant: Woodward, Inc., Fort Collins, CO (US)

(72) Inventor: Michael Hahn, Loves Park, IL (US)

(73) Assignee: WOODWARD, INC., Fort Collins, CO (US)

(*) Notice: Subject to any disclaimer, the term of this patent is extended or adjusted under 35 U.S.C. 154(b) by 120 days.

(21) Appl. No.: 16/163,338

(22) Filed: Oct. 17, 2018

(65) Prior Publication Data
US 2020/0123986 A1 Apr. 23, 2020

(51) Int. Cl.
F02C 9/26 (2006.01)
F02C 7/22 (2006.01)
F02C 7/232 (2006.01)
G05B 6/02 (2006.01)
F02C 9/28 (2006.01)
G05B 5/01 (2006.01)
G05D 7/01 (2006.01)

(52) U.S. Cl.
CPC ............. F02C 9/263 (2013.01); F02C 7/222 (2013.01); F02C 7/232 (2013.01); F02C 9/28 (2013.01); G05B 5/01 (2013.01); G05B 6/02 (2013.01); G05D 7/0126 (2013.01); F05D 2270/306 (2013.01); F05D 2270/702 (2013.01)

(58) Field of Classification Search
None
See application file for complete search history.

(56) References Cited

U.S. PATENT DOCUMENTS

| 6,343,617 B1* | 2/2002 | Tinsley | G05D 7/0635 137/486 |
|---|---|---|---|
| 2002/0059799 A1 | 5/2002 | Lavie et al. | |
| 2010/0037961 A1 | 2/2010 | Tysver et al. | |
| 2010/0260617 A1 | 10/2010 | Haertl | |
| 2016/0258798 A1 | 9/2016 | Muhammad et al. | |
| 2016/0273775 A1* | 9/2016 | Griffiths | F23R 3/343 |
| 2016/0306365 A1 | 10/2016 | Wilson et al. | |
| 2017/0292457 A1 | 10/2017 | Selstad | |

OTHER PUBLICATIONS

Written Opinion of the International Search Authority for International Application No. PCT/US2019/042562, filed Jul. 19, 2019, dated Oct. 2, 2019, 7 pages.

* cited by examiner

Primary Examiner — Sean Shechtman
(74) Attorney, Agent, or Firm — McAndrews, Held & Malloy, Ltd.

(57) ABSTRACT

The present disclosure describes a fuel system for an engine. The fuel system includes a fuel metering valve, a flow measuring system, and a controller in communication with the fuel metering valve and the flow measuring system. The fuel metering valve is operable to meter a flow rate of fuel based on a stroke of the fuel metering valve. The flow measuring system is configured to measure a mass flow rate of the fuel leaving the fuel system at a bandwidth greater than 20 Hz. The controller is configured to dynamically adjust the stroke of the fuel measuring system based on the mass flow rate of the fuel measured by the flow measuring system to change the flow rate of the fuel.

21 Claims, 5 Drawing Sheets

DIRECT FEEDBACK REGARDING METERED FLOW OF FUEL SYSTEM

FIELD

This disclosure relates to fuel systems for aircraft turbine engines and, in particularly, systems that include direct feedback regarding the measured and metered fuel mass flow rate.

BACKGROUND

Fuel systems, or fuel metering units ("FMU"), for gas turbine engines typically include a fuel source and one or more pumps to deliver pressurized fuel to a combustor section of an engine. In particular, the fuel source provides pressurized fuel to a manifold with nozzles on it, and those nozzles discharge fuel into the combustor. A fuel system typically includes a metering valve downstream of a pump that regulates fuel flow to the combustor section and a bypass fuel line to recirculate fuel from a location between the pump and the metering valve to a location upstream of the pump. A typical fuel system also includes a pressure regulating bypass valve in the bypass fuel line that maintains a fixed differential pressure across the metering valve by controlling the fuel flowing through the bypass fuel line.

A common method of determining fuel flow through the fuel system includes using the position of the metering valve, also referred to as the metering valve stroke, to determine an associated fuel flow by referencing known fuel flow rates for the particular metering valve position values. Estimation of fuel flow can be performed based on a nearly-constant pressure regulation of the valve across a metering window with a known area. However, if the discharge pressure of fuel leaving the FMU for the nozzles changes rapidly (for example, the nozzle inlet pressure drops rapidly) there is typically a lag between the occurrence of that discharge pressure change and the bypass valve operating to adjust the flow and, thus, the pressure across the metering valve to correct for the discharge pressure change.

The architecture for such a system is shown in FIG. 1. The FMU uses a look up table 1 that correlates fuel flow and pressure with the window of the metering valve. Based on the look up table 1, the system can estimate the desired size of the window in the metering valve depending on the desired flow rate (Wf) of metered fuel. Based on that estimation, a position command (V/Vcmd) for the metering valve is sent to a summing junction 2. The summing junction 2 also receives information about the actual measured position or stroke of the metering valve via a linear variable differential transformer ("LVDT") connected to the metering valve (demodulator dynamics 3). The summing junction 2 determines if there is a difference or error between the commanded position and the measured position. If there is an error, a proportional-integral-derivative ("PID") control 4 sends a control signal (current) which commands the servo to move the metering valve to the correct position (servovalve dynamics 5 and actuator integration 6) until the error is effectively zero. After the metering valve stroke is adjusted, fuel system dynamics 7 occur in response to the change in the metering valve stroke (e.g., bypass valve dynamics, downstream nozzle dynamics, etc.). There may also be exogenous disturbances to the system. The metered flow out of the system is affected by the fuel system dynamics and exogenous disturbances. Thus, the system of FIG. 1 measures the position of the metering valve but does not measure the actual metered flow. Metered flow is estimated based solely on the information regarding metered valve stroke and the look up table.

Further limitations and disadvantages of conventional and traditional approaches will become apparent to one of skill in the art, through comparison of such systems with some aspects of the present disclosure as set forth in the remainder of the present application with reference to the drawings.

SUMMARY

Certain aspects of the present technology provide a metered fuel flow feedback system for a fuel system of a turbine engine. The metered fuel flow feedback system comprises a fuel metering valve, a flow measuring system, and a controller in communication with the fuel metering valve and the flow measuring system. The fuel metering valve is operable to meter a flow rate of fuel based on a stroke of the fuel metering valve. The flow measuring system is configured to measure a mass flow rate of the fuel leaving the fuel system at a bandwidth greater than 20 Hz. The controller is configured to dynamically adjust the stroke of the fuel metering valve based on the mass flow rate of the fuel measured by the flow measuring system to control the flow rate metered by the fuel metering valve and to reject disturbances in the fuel system.

The flow measuring system may include a flow sensing valve. The flow sensing valve may include a linear variable differential transformer that communicates a position of a piston in the flow sensing valve to the controller. The position of the piston may correspond directly with the mass flow rate. The flow measuring system may include a flow meter. The flow meter may be at least one of an ultrasonic flow meter, a turbine flow meter, a target flow meter, optical meter, or a Coriolis flow meter.

The fuel metering valve may be connected to a linear variable differential transformer that communicates information regarding a position of a piston in the fuel metering valve to the controller. The metered fuel flow feedback system may comprise an electrohydraulic servo valve that is in communication with the controller that operates the fuel metering valve. The controller may be configured to adjust the stroke of the fuel metering valve via the electrohydraulic servo valve based at least in part on the information related to the piston.

The flow measuring system may be upstream of the fuel metering valve. The flow measuring system may be downstream of the fuel metering valve. The metered fuel flow feedback system may comprise a bypass valve and a pump located upstream of the fuel metering valve. The bypass valve may discharge the fuel to a line that feeds into the pump. The metered fuel flow feedback system may comprise a system pressurizing valve downstream of the flow measuring system. The pump may be fed fuel from a boost pump. The boost pump may pressurize the system pressurizing valve. The controller may be configured to use a measured stroke of the fuel metering valve and a lookup table to estimate a desired stroke of the fuel metering valve to effectuate a desired flow if the flow measuring system fails or is deactivated.

Certain aspects of the present technology provide a fuel system for an engine. The fuel system may comprise a fuel metering valve, a flow sensing valve, and a controller in communication with the fuel metering valve and the flow sensing valve. The fuel metering valve may be operable to meter a flow rate of fuel based on a stroke of the fuel metering valve. The flow sensing valve may be downstream of the fuel metering valve and may be configured to measure a mass flow rate of the fuel leaving the fuel system at a bandwidth greater than 20 Hz. The controller may be configured to dynamically adjust the stroke of the fuel metering valve based on the mass flow rate of the fuel measured by the flow sensing valve to change the flow rate of the fuel.

The fuel metering valve may be connected to a linear variable differential transformer that communicates information regarding a position of a piston in the fuel metering valve to the controller. The fuel system may include an electrohydraulic servo valve that is in communication with the controller and that operates the fuel metering valve. The controller may be configured to adjust the stroke of the fuel metering valve via the electrohydraulic servo valve based at least in part on the information related to the piston.

The fuel system may include a bypass valve and a pump located upstream of the fuel metering valve. The bypass valve may discharge fuel to a line that feeds into the pump. The fuel system may include a system pressurizing valve downstream of the flow sensing valve. The pump may be fed fuel from a boost pump. The boost pump may pressurize the system pressurizing valve.

Certain aspects of the present technology provide a method for controlling a flow rate of fuel in a fuel system. The method may include feeding the fuel from a fuel source into a pump in the fuel system. The method may include pumping the fuel from the pump to a fuel metering valve in the fuel system. The method may include measuring, by a flow measuring system operating at a bandwidth greater than 20 Hz, a mass flow rate of the fuel in the fuel system. The method may include discharging the fuel from the fuel system. The method may include dynamically adjusting, by a controller communicatively coupled to the flow measuring system and the fuel metering valve, the flow rate through the fuel metering valve based directly on the mass flow rate of the fuel measured by the flow measuring system.

The controller may be configured to operate at a bandwidth greater than 250 Hz. The dynamically adjusting the flow rate may comprise the controller sending a command to an electrohydraulic servo valve operable to modify a position of a piston of the fuel metering valve.

These and other advantages, aspects and novel features of the present disclosure, as well as details of an illustrated embodiment thereof, will be more fully understood from the following description and drawings.

Figure 1:
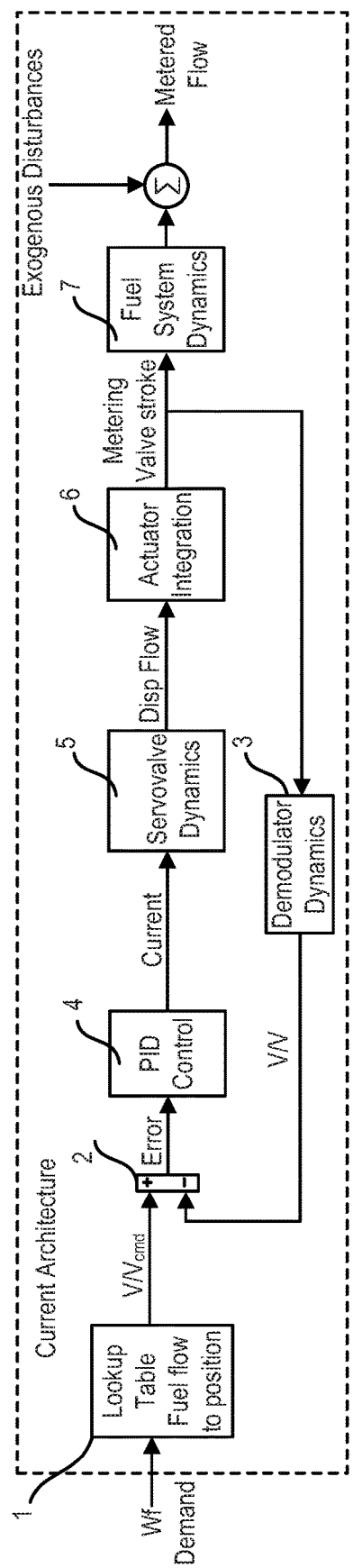
FIG. 1 illustrates architecture of a conventional fuel metering unit system.

The foregoing summary, as well as the following detailed description of certain embodiments of the present technologies, will be better understood when read in conjunction with the appended drawings. For the purpose of illustrating the technologies, there is shown in the drawings, certain embodiments. It should be understood, however, that the present technologies are not limited to the arrangements and instrumentality shown in the attached drawings.

DETAILED DESCRIPTION

Figure 2:
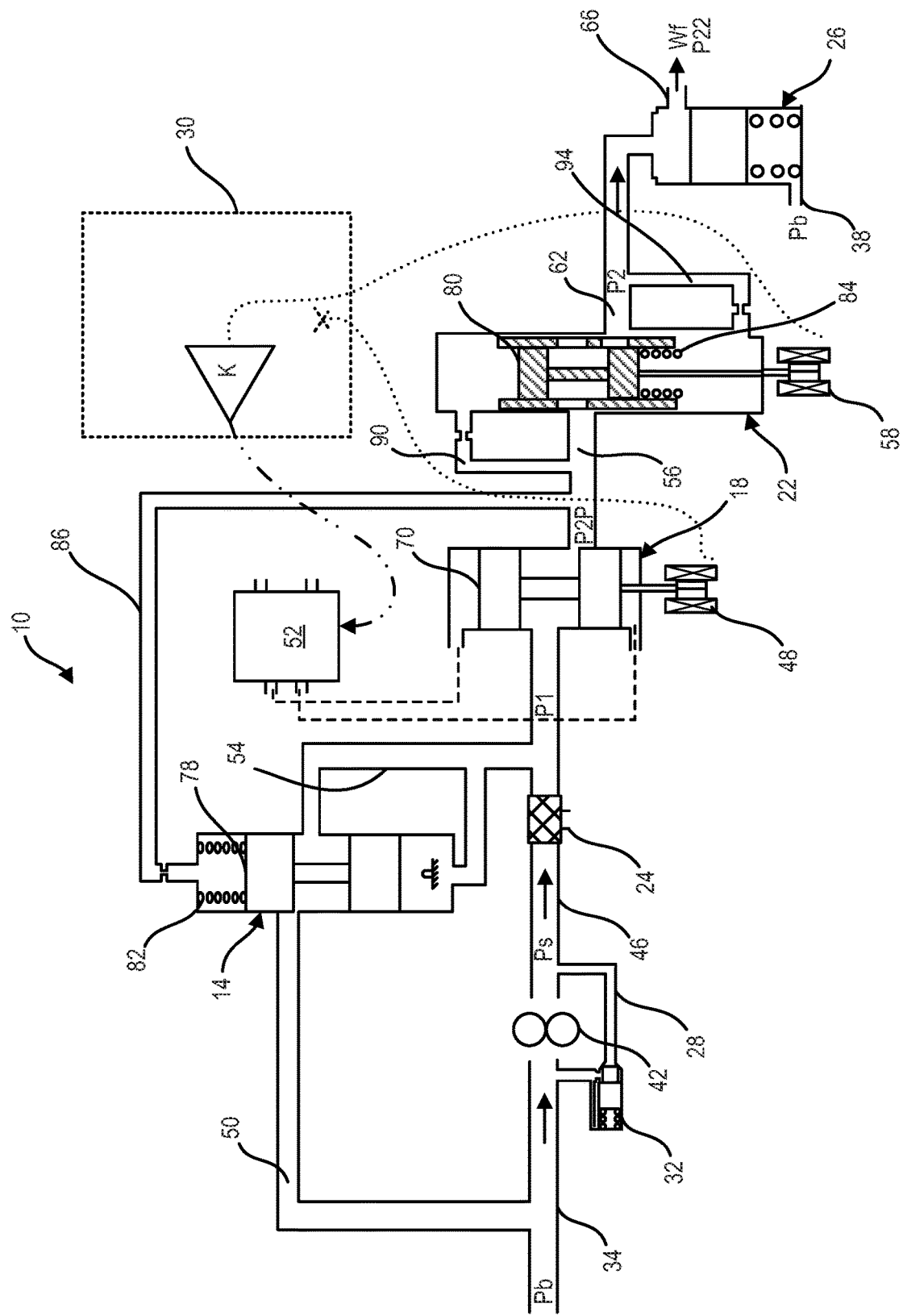
FIG. 2 illustrates an FMU schematic for a turbine engine according to an embodiment of the present technology.

FIG. 2 illustrates an FMU 10 for a turbine engine. The FMU 10 includes a bypass valve 14, a fuel metering valve 18, a flow measuring system or flow meter that includes a flow sensing valve 22, a system pressurizing valve 26, and a controller 30, which may be a full authority digital engine control ("FADEC"), a FADEC in combination with a Distributed Control Module ("DCM"), or other kind of electronic engine controller. A boost pressure pump (not shown) feeds pressurized fuel from a fuel source (not shown) into a first feed line 34 that leads into the FMU 10 and a second feed line 38 that leads into the system pressurizing valve 26. In this way, the boost pressure pump keeps the FMU 10 pressurized.

The first feed line 34 leads into a pump 42, which, by way of example only, may be a gear pump or any suitable pump. The gear pump 42 in turn feeds into a third feed line 46. The third feed line 46 leads to the metering valve 18. The third feed line 46 also has an actuator feed line 24 and high pressure relief valve 28 extending from it. The relief valve 28 is connected to a valve 32 that feeds back into the first feed line 34. The metering valve 18 is connected to a linear variable differential transformer ("LVDT") 48 and to an electrohydraulic servo valve ("EHSV") 52 that adjusts the stroke (i.e., the velocity and position) of the metering valve 18. A bypass line 54 extends from the third feed line 46 to the bypass valve 14. A first exit line 50 extends from the bypass valve 14 back to the first feed line 34. A fuel valve exit line 56 extends from the fuel valve 18 to the flow sensing valve 22. The flow sensing valve 22 is connected to an LVDT 58. A sensing valve exit line 62 extends from the flow sensing valve 22 to the system pressurizing valve 26, and a second exit line 66 extends from the system pressurizing valve 26 to a downstream manifold (not shown) having nozzles that discharge the fuel into a combustor of the turbine engine.

The FMU 10 also includes a first sense line 86 that extends from the fuel valve exit line 56 to the bypass valve 14 and a second sense line 90 that extends from the fuel valve exit line 56 to the flow sensing valve 22. A third sense line 94 extends from the sensing valve exit line 62 to the flow sensing valve 22.

The controller 30 is connected to and in communication with the LVDTs 48 and 58 of the metering valve 18 and flow sensing valve 22, respectively. The controller 30 is also connected to and in communication with the EHSV 52 of the metering valve 18. The controller 30 controls the flow of fuel to the combustor. To do so, the controller 30 receives various input signals and controls the fuel flow rate, via the metering valve 18, to the combustor. By way of example, the controller 30 can include a DCM and FADEC wherein the DCM is connected to and in communication with the metering valve 18, the flow sensing valve 22, and the FADEC, and the FADEC sends commands to the DCM to control the metering valve 18.

In operation, fuel is fed into the first feed line 34 and the second feed line 38 from the fuel source by the boost pressure pump. The fuel in the first feed line 34 and second feed line 38 is pressurized at a boost pressure (Pb). The fuel in the first feed line 34 flows into the gear pump 42, which discharges fuel at a generally constant volumetric flow rate and a pump flow pressure (Ps) into the third feed line 46. By way of example, the gear pump 42 may discharge fuel at a variety of generally fixed flow rates. The fuel flows along the third feed line 46 into the metering valve 18 at a pressure (P1), which depends on how much of the fuel valve exit line 56 is blocked by the piston 70 of the metering valve 18, i.e., the size of the orifice or port that leads into the fuel valve exit line 56 and the downstream pressure (P22).

Fuel also feeds from the third feed line 46 into the actuator feed line 24, which leads to an actuation system (not shown). The fuel fed to the actuator system is used for accessory purposes, such as for providing flow and pressure to fueldraulic engine actuators. The fuel traveling from the actuation system is then routed to a location upstream of the gear pump 42. In addition, fuel feeds into the exit line 28 to the valve 32. The valve 32 blocks flow of fuel back into the first feed line 34 unless the pressure (Ps) in the third feed line 46 reaches a threshold limit, at which pressure the valve 32 opens to allow fuel to feed into the first feed line and relieve the pressure in the third feed line 46.

The position of piston 70 of the metering valve 18 (and thus how much of the flow port or orifice to the exit line 56 is blocked by the piston 70) is controlled by the controller 30. The controller 30 monitors the position of the piston 70 via communication with the LVDT 48, which provides information about the position of the piston 70 by measuring its displacement. The controller 30 can use that information to determine whether to move the piston 70 to open up or further close off the valve flow port area that leads to the fuel valve exit line 56. The controller 30 controls the EHSV 52 to move the piston 70 to a desired position with respect to the port into the fuel valve exit line 56.

Changes in fuel flow rate and fuel pressure occur at the metering valve 18 due to the size of the port defined by the position of the piston 70 with respect to fuel valve exit line 56. Therefore, excess pump flow goes through bypass line 54 from the third feed line 46 to the bypass valve 14. In other words, the flow rate of fuel out of the metering valve 18 plus the flow rate of fuel to the bypass valve 14 approximately equals the fixed flow rate out of the gear pump 42. The pressurized fuel that flows in the bypass line 54 to the bypass valve 14 pushes a piston 78 of the bypass valve 14 upward against a spring 82 and pressurization provided by first sense line 86 and flows out of the bypass valve 14 into the first exit line 50. The fuel is then fed back into to the first feed line 34 to be sent through the gear pump 42 again.

Thus, the bypass valve 14 operates in response to the movements of the metering valve 18. That is to say, if the metering valve 18 is opened more (by the controller 30 moving the piston 70 downward) to create a greater flow out of the metering valve 18, the bypass valve 14 closes (via expansion of the spring 82 and the sum of the pressure forces on the bypass valve 78 due to less flow of fuel into the bypass valve 14) to reduce the flow out of the bypass valve 14. Conversely, if the piston 70 of the metering valve 18 is moved upward by the controller 30 to reduce the flow coming out of the metering valve 18, the bypass valve 14 opens more (via compression of the spring 82 and the sum of the pressure forces acting on the ends of piston due to increased flow into the bypass valve 14) to increase the flow out of the bypass valve 14.

After exiting the metering valve 18, the pressurized fuel flows into the flow sensing valve 22 at a pressure (P2P). The flow sensing valve 22 includes a piston 80 that is connected to a spring 84. The spring 84 applies upward resistance against the piston 80 to keep the valve 22 in a generally closed position. A fuel pressure is fed from the fuel metering valve 18 into the bypass valve 14 downstream first sense line 86 where the fuel pressurizes the valve 14 by applying a downward force on the piston 78. The flow sensing valve 22 upstream second sense line 90 pressurizes from the fuel provided by the fuel metering valve 18 applying a downward force on the piston 80 of the flow sensing valve 22.

The fuel flows out of the flow sensing valve 22 and into the sensing valve exit line 62, through the system pressurizing valve 26, and out of the FMU 10 through the second exit line 66 to the nozzles in the downstream manifold. The fuel that leaves the flow sensing valve 22 flows along the sensing valve exit line 62 at a pressure (P2), which may, for example, be 50 psi less than P2P. A pressure sense line in the sensing valve exit line 62 is fed into the third sense line 94 to the flow sensing valve 22 where the fuel pressurizes the valve 22 by applying an upward force on the piston 80. The fuel that exits the FMU 10 toward the nozzles has a metered or discharged flow rate designated by Wf and a discharge pressure designated by P22, which, by way of example, may be 100 psi less than P2. The system pressurizing valve 26 is a back pressure valve that maintains a defined pressure (P2) upstream of itself. When fluid pressure exceeds a set point, the system pressurizing valve 26 may open more to relieve the excess pressure.

As fuel flows into the flow sensing valve 22, the fuel pushes down on the pressurized piston 80 and against the spring 84. The linear position of the piston 80 due to the flow of fuel through the flow sensing valve 22 is detected by the LVDT 58. The LVDT 58 measures the movement of the piston 80 and communicates that information to the controller 30. The amount of movement of the piston 80 directly corresponds with a measured mass flow rate. Based on that feedback information, the controller 30 is provided with the actual mass flow rate of the fuel that is discharged out of the FMU 10 via the sensing valve exit line 62 and the second exit line 66 to the nozzles in the downstream manifold.

Various embodiments provide that the flow sensing valve 22 operates at a bandwidth above 20 Hz to provide the measured mass flow rate to the controller 30. Bandwidths above 20 Hz are preferable to bandwidths below 20 Hz because mass flow rate measurements provided by a flow sensing device operating at a bandwidth below 20 Hz may not be used directly by the controller 30 in real-time to adjust the flow rate via control of the flow metering valve 18 due to latency issues. In an exemplary embodiment, the feedback information provided by the flow sensing device 22 to the controller 30 corresponds directly to a measured mass flow rate. For example, providing feedback information corresponding directly to a mass flow rate measurement is preferable to providing information that may be used to calculate a mass flow rate. As an example, providing information regarding a measured volumetric flow rate and a measured temperature of the flow rate to a controller such that the controller may estimate and/or otherwise calculate a mass flow rate may have a bandwidth under 20 Hz due to the thermal time constant of the temperature measurement system. It may also suffer from accuracy issues for specific gravity estimation. As one example, the accuracy issues may result from applying constant specific gravity versus temperature lookup to perform the mass flow rate calculations that may vary in practice. For example, a fuel specific gravity may have different values depending on the geographic location or time of year due to production variation of fuels. In this way, applying a constant value for specific gravity in order to calculate a mass flow rate may be inaccurate.

In certain embodiments, the mass flow sensing device 22 includes various mechanisms for achieving the bandwidth above 20 Hz. For example, a flow sensing valve 22 may include limiting the spring rate of the loading spring 84 to less than 25% of the preload of the spring so that most of the available force from the P2P-P2 error is used to position the piston 80 of the flow sensing valve 22. As another example, the flow sensing valve 22 may comprise friction reduction features, such as velocity compensating holes or any suitable friction reduction feature that reduces damping in the flow sensing valve 22. Furthermore, the port width of the flow sensing valve 22 may be maximized to minimize a change in position of the piston 80 compared to a change in mass flow rate. The port width sizing may also be selected to infer an exponential shaped port to provide a constant change in position compared to a change in percentage flow to obtain a linear stroke compared to the mass flow rate.

Due to the configuration and operation of the nozzles and their distance from the FMU 10, the discharge pressure (P22) can vary as fuel is fed from the FMU 10 to the nozzles. If the discharge pressure (P22) changes, the discharge flow rate (Wf) can also change. Because the sensing valve 22 dynamically measures the flow rate of fuel leaving the FMU 10 and provides that information to the controller 30 at a bandwidth of over 20 Hz, the controller 30 can determine if the discharge flow rate (Wf) is changing and adjust the piston 70 of the metering valve 18 in substantially real-time via the EHSV 52 to increase or decrease the flow rate of fuel out of the metering valve 18 as necessary such that the discharge flow rate (Wf) is at the desired level. In other words, if the flow rate measured by flow sensing valve 22 is not at a desired flow rate, the controller 30 can control the EHSV 52 to move the piston 70 of the fuel metering valve 18 to a position that increases or decreases the flow rate as necessary to get to the desired mass flow rate. Thus, the flow sensing valve 22 provides direct feedback regarding the discharge or metered flow rate out of the FMU 10. The flow measuring system 22 or sensor measures the mass flow rate of fuel metered to the engine combustor with a signal processing bandwidth that is higher than the required or desired bandwidth of 20 Hz in order to avoid or limit delays in relaying information about the flow rate to the controller 30. In various embodiments, controller 30 operates at a bandwidth above 250 Hz in order to provide enough speed to reject disturbances allowing the system to respond in substantially real-time to fuel demand changes and to metered flow disturbances. The controller bandwidth above 250 Hz may also allow the inner position loop of the metering valve servo 212 and the FMV LVDT 48 to increase in bandwidth to around 30 Hz while maintaining sufficient stability and phase margin in the metering valve position closed loop.

It will be understood that the FMU 10 of the present technology can include a backup redundancy mode in case the controller 30 or flow measuring system 22 or sensor fails. This backup mode operates like the FMU system described in FIG. 1.

Figure 6:
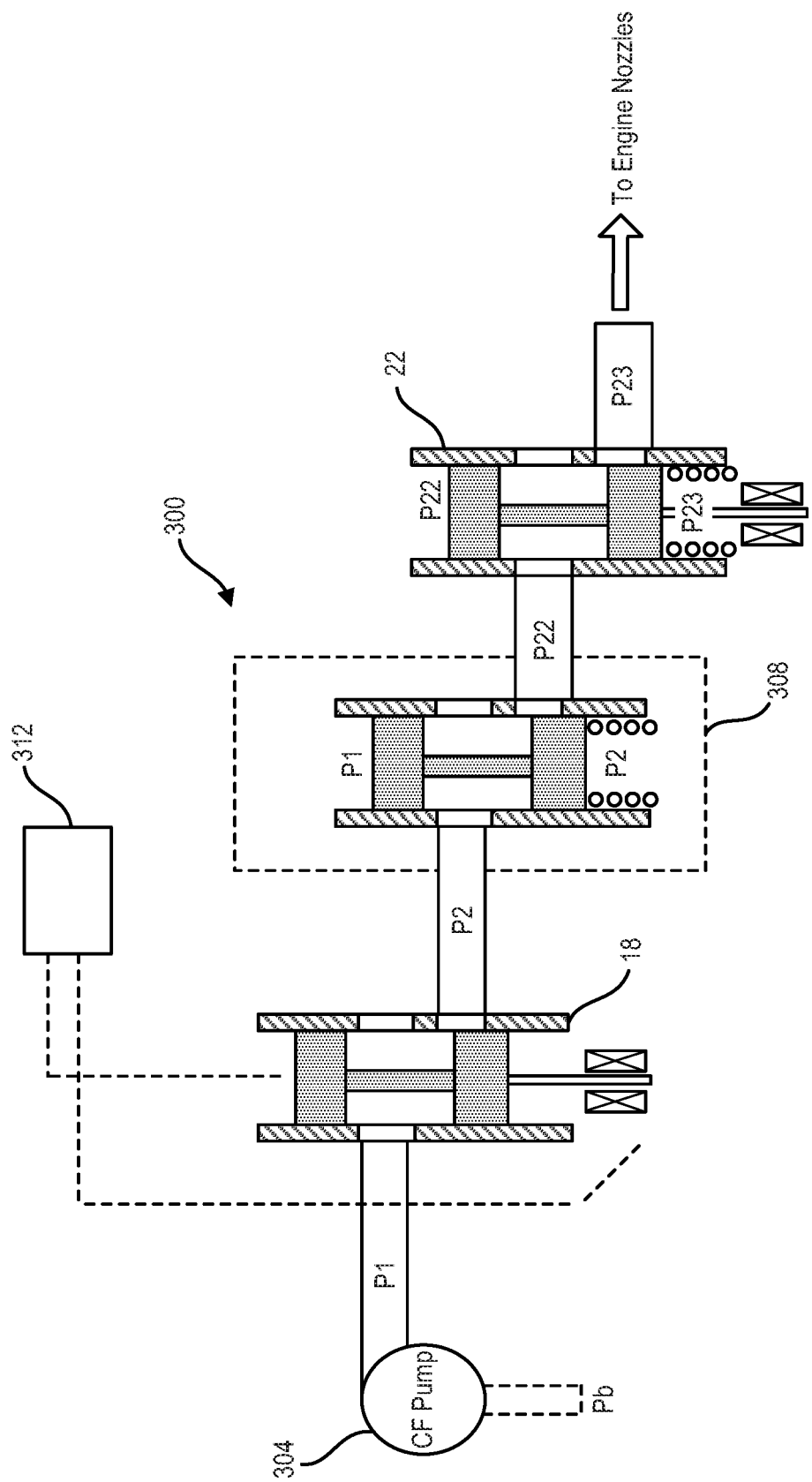
FIG. 6 illustrates an FMU schematic that includes a throttling valve.

In addition, while the present technology has been disclosed with respect to a positive displacement pump fuel metering system, it will be understood that the technology (e.g., the controller 30 and the flow measuring system 22 of the present technology) could be used with a centrifugal fuel system that throttles pump flow rather than bypasses it via a bypass valve 14. Examples of such throttling systems are disclosed in U.S. Pat. No. 7,096,658, which is incorporated by reference in its entirety. An example of a centrifugal system 300 is shown in FIG. 6. The system 300 includes a centrifugal pump 304 that feeds a metering valve 18, which in turn feeds a throttling valve 308, which in turn feeds the flow sensing valve 22. A servo valve 312 controls the metering valve 18. The system includes a controller like the system of FIG. 2 but the controller is not shown. The throttling valve 308 throttles the flow from the metering valve 18 to the flow sensing valve 22 in order to maintain a substantially constant pressure drop across the metering valve 18. In such throttling systems like system 300, the flow measuring system 22 can measure the mass flow rate of metered fuel and provide feedback to the controller such that the controller can dynamically control the fuel metering valve 18 to further open or restrict the fuel metering valve 18 as necessary.

In addition, while the present technology has been disclosed with respect to a positive displacement pump fuel metering system, it will be understood that the technology (e.g., the controller 30 and the flow measuring system 22 of the present technology) could be used with a centrifugal fuel system that throttles pump flow rather than bypasses it via a bypass valve 14. Examples of such throttling systems are disclosed in U.S. Pat. No. 7,096,658, which is incorporated by reference in its entirety. In such throttling systems, the flow measuring system 22 can measure the flow rate of metered fuel and provide feedback to the controller 30 such that the controller 30 can dynamically control the fuel metering valve 18 to further open or restrict the fuel metering valve 18 as necessary.

It will be understood that feedback can be provided to the controller 30 by other kinds of flow measuring systems or flow meters besides the flow sensing valve 22 shown in FIG. 2 and described above. Any number of other devices, products, systems, or technologies that can dynamically measure, monitor, or determine the mass flow rate of fluid (e.g., a flow meter may be used in the FMU 10 to provide the feedback to the controller 30 regarding the measured mass flow rate of the metered flow for the FMU 10). By way of example, the flow measuring system could include an ultrasonic flow meter with a densitometer, a target flow meter, a turbine flow meter with a densitometer, a Coriolis flow meter, or any suitable flow measuring or sensor device operable to provide above 20 Hz bandwidth.

It will be understood that the various valves and lines of the FMU 10 may be located in different places and distances with respect to each other than as shown in FIG. 2. For example, the flow measuring system 22 may be provided upstream of the fuel metering valve 18 instead of downstream as illustrated in FIG. 2.

Figure 3:
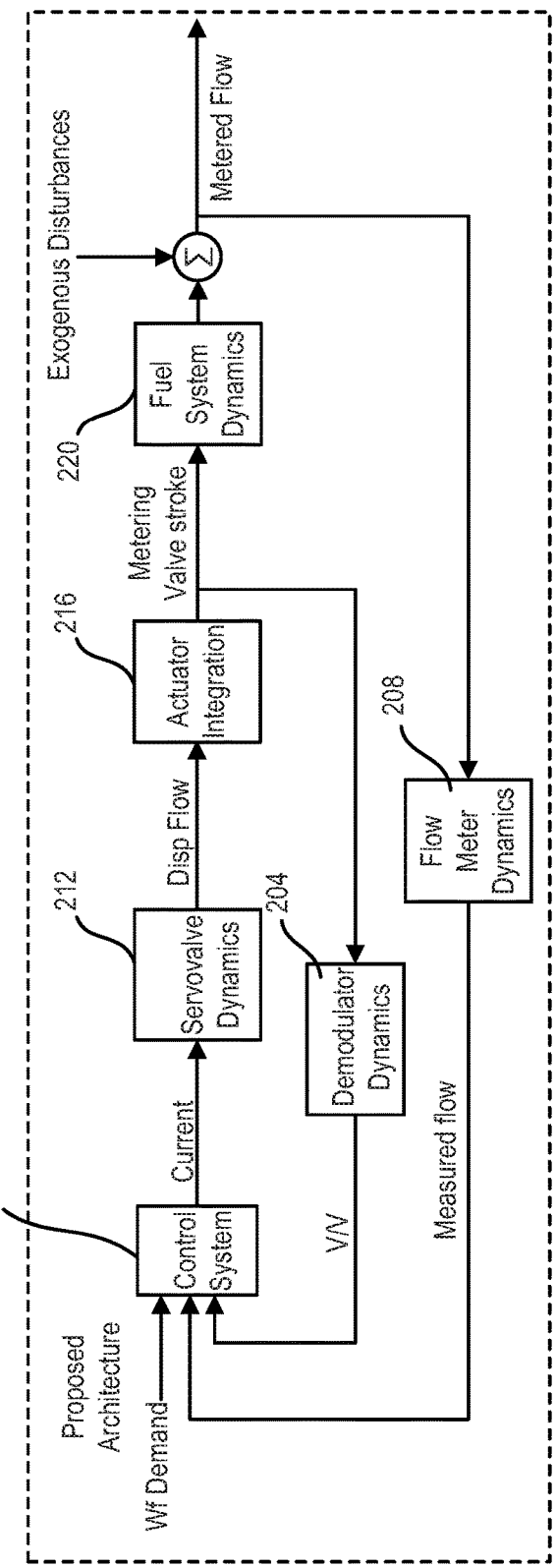
FIG. 3 illustrates architecture of the FMU system of FIG. 2.

FIG. 3 shows the architecture for the FMU 10 of FIG. 2. In that regard, a desired flow (Wf) is communicated to a control system 200. As a redundancy, the control system 200 (e.g., the controller or FADEC) may also receive information about the actual stroke/position of the fuel metering valve from an LVDT connected to the metering valve (demodulator dynamics 204). The control system 200 receives information (flow meter dynamics 208) from the fuel measuring system (e.g., flow meter or flow sensing valve). Based on that information 208 from the fuel measuring system, the control system 200 sends a command (current) to the EHSV which adjusts the stroke of the fuel metering valve (servovalve dynamics 212 and actuator integration 216) so that the system provides the desired flow (Wf). The change in the stroke of the fuel metering valve leads to fuel system dynamics 220 (e.g., effects on system due to change of stroke). In an exemplary embodiment, a feedforward controller may be used to cancel the poles of the servovalve and metering valve dynamics 212. Because the fuel measuring system is downstream of the effect of fuel system dynamics 220 and exogenous disturbances, and because the fuel measuring system operates at a bandwidth above 20 Hz, the fuel measuring system is able to provide feedback 208 to the control system 200 about the actual metered flow that is fed to the combustor in substantially real-time. In this way, the control system 200 can dynamically adjust the stroke of the fuel metering valve so as to discharge fuel at the desired fuel flow (Wf) in reaction to disturbances. These disturbances can be from actuation demands that can drastically change the inlet flow or rapid nozzle pressure changes which, when coupled with a slow and stable bypassing system, could otherwise cause fuel flow transients that reduce the stall margin to the aircraft turbine engine. Should the fuel measuring system fail or be deactivated, the control system 200 can rely on the information related to metering valve position (demodulator dynamics 204) to control the metering valve. In this way, the system has a redundancy or backup system in place.

Figure 4:
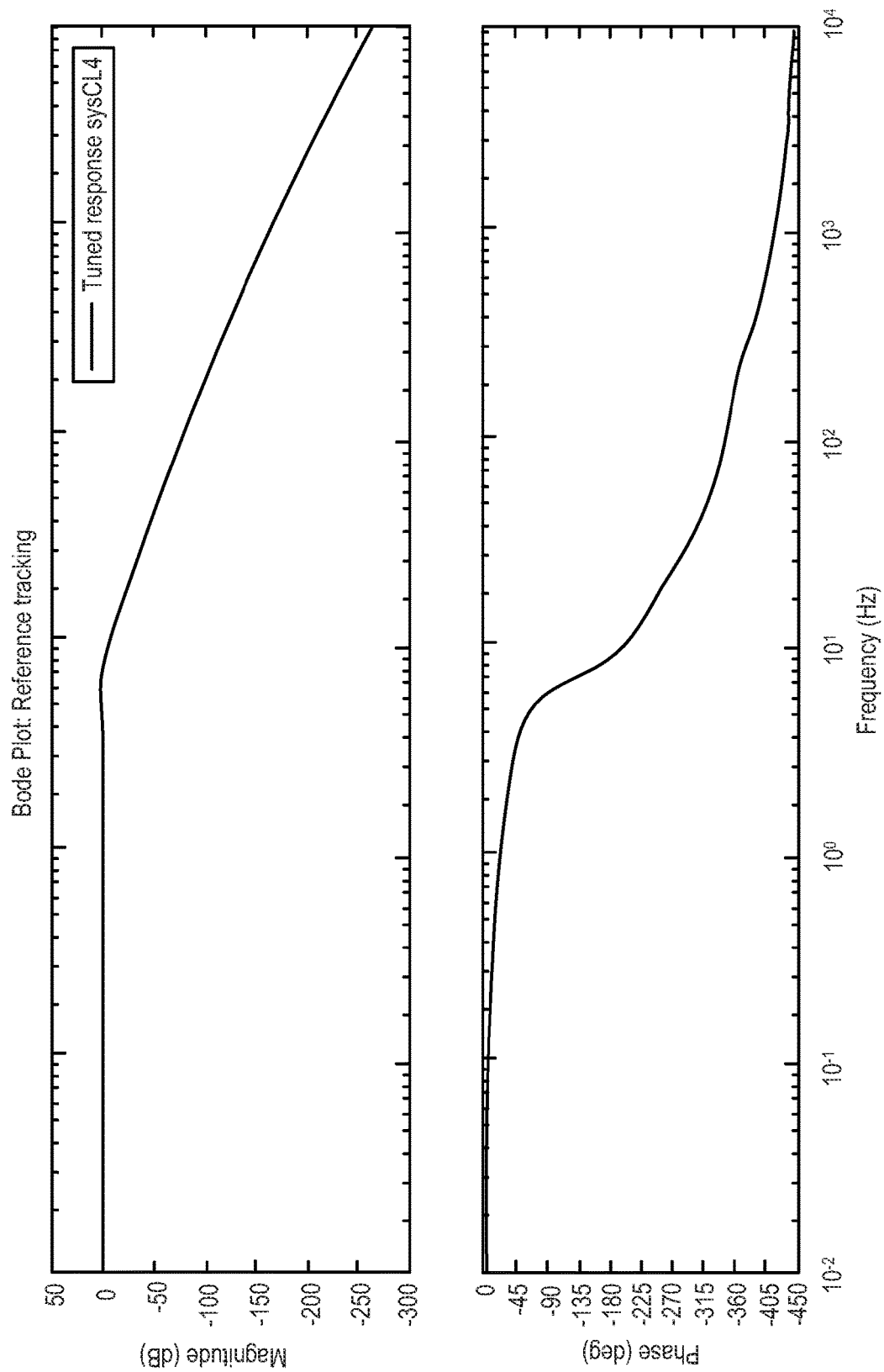
FIG. 4 is graph that represents how metered flow of the FMU system of FIG. 2 tracks commanded flow.
Figure 5:
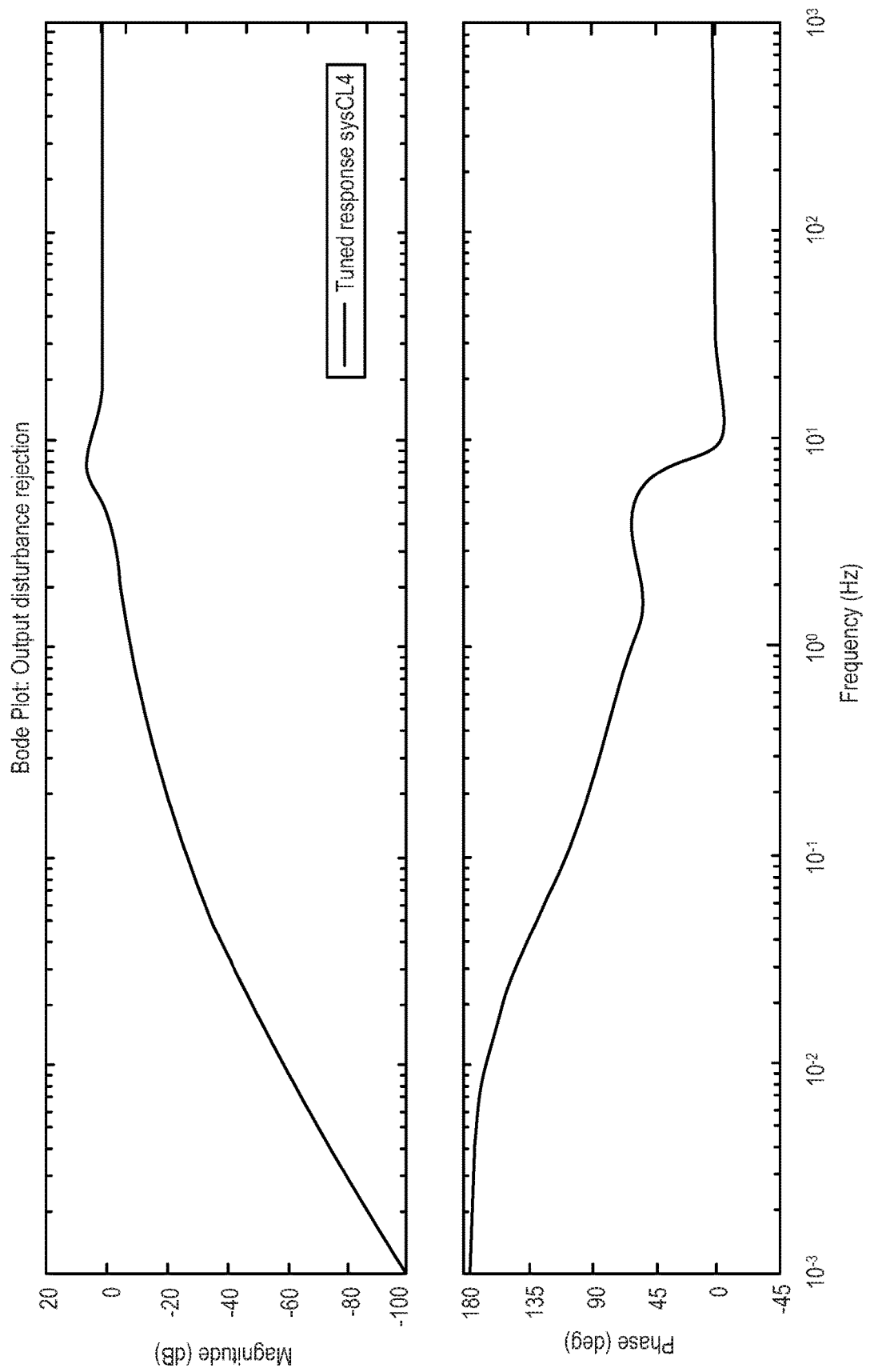
FIG. 5 is a graph that represents how the FMU system rejects disturbances that effect metered flow.

The combination of the FMU 10, controller 30 and measuring device 22 provides a significant advantage over existing FMU systems. It dynamically monitors the metered flow rate of fuel out of the FMU 10 and provides direct feedback to the controller 30 about the mass flow rate so that that the controller 30 can command the fuel valve 18 to adjust the fuel valve to correct the metered flow rate. Moreover, the FMU 10 measures the actual metered mass flow rate (and thus accounts for fuel system dynamics and exogenous disturbances) and does not just estimate metered flow based on metering valve position and a look up table. Also, because the flow meter is reading direct mass flow it can accommodate fuel system thermal transients and other fuel system transients that may otherwise reduce engine margins. Consequently, the FMU 10 can dynamically adjust to fluctuations in discharge pressure and metered flow due to downstream nozzle pressure changes in contrast to existing FMU systems, which rely on a bypass valve to correct the flow and pressure across the metering valve 18 in response to changes in pressure downstream of the fuel metering valve 18. In this way, the FMU 10 helps maintain more consistent fuel flow to the combustor even when there are rapid or large changes in the discharge pressure. FIGS. 4 and 5 are examples of graphs that illustrate the efficacy of the FMU 10 in responding to exogenous disturbances with respect to the metered flow. FIG. 4 illustrates how well metered fuel flow (Wf) of the FMU tracks desired fuel flow (the Wf command in FIG. 3). For example, as shown in FIG. 4, the metered fuel flow (Wf) substantially matches the desired fuel flow (Wf Demand) at frequencies up to around 1 Hz. FIG. 5 illustrates how well the FMU 10 rejects disturbances to metered flow. For example, FIG. 5 shows that the entire disturbance is canceled out at 0.001 Hz. If there is a disturbance at a frequency of 1 Hz, the system would adjust the metering valve to cancel out the effect of 99% (i.e., −10 dB) of that disturbance.

As used herein, an element or step recited in the singular and proceeded with the word "a" or "an" should be understood as not excluding plural of said elements or steps, unless such exclusion is explicitly stated. Furthermore, references to "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, a component is "operable" and/or "configured" to perform a function whenever the component comprises the necessary structure, hardware, and/or code (if any is necessary) to perform the function, regardless of whether performance of the function is disabled, or not enabled, by some user-configurable setting.

While endeavoring in the foregoing specification to draw attention to those features of the disclosure believed to be of particular importance it should be understood that the Applicant claims protection in respect of any patentable feature or combination of features herein before referred to and/or shown in the drawings whether or not particular emphasis has been placed thereon. In addition, while particular elements, embodiments and applications of the present disclosure have been shown and described, it will be understood that the disclosure is not limited thereto since modifications can be made by those skilled in the art without departing from the scope of the present disclosure, particularly in light of the foregoing teachings.

The invention claimed is:

1. A metered fuel flow feedback system for a fuel system of a turbine engine, the metered fuel flow feedback system comprising:
   a fuel metering valve operable to meter a flow rate of fuel based on a stroke of the fuel metering valve;
   a flow measuring system comprising a flow meter configured to measure a mass flow rate of the fuel leaving the fuel system at a bandwidth greater than 20 Hz, wherein the flow meter is at least one of an ultrasonic flow meter, a turbine flow meter, a target flow meter, an optical meter, or a Coriolis flow meter;
   a controller in communication with the fuel metering valve and the flow measuring system, wherein the controller is configured to dynamically adjust the stroke of the fuel metering valve based on the mass flow rate of the fuel measured by the flow measuring system to control the flow rate metered by the fuel metering valve and to reject disturbances in the fuel system.

2. The metered fuel flow feedback system of claim 1, wherein the fuel metering valve is connected to a linear variable differential transformer that communicates information regarding a position of a piston in the fuel metering valve to the controller.

3. The metered fuel flow feedback system of claim 2, comprising an electrohydraulic servo valve that is in communication with the controller and that operates the fuel metering valve, wherein the controller is configured to adjust the stroke of the fuel metering valve via the electrohydraulic servo valve based at least in part on the information related to the piston.

4. The metered fuel flow feedback system of claim 1, wherein the flow measuring system is downstream of the fuel metering valve.

5. The metered fuel flow feedback system of claim 1, wherein the flow measuring system is upstream of the fuel metering valve.

6. The metered fuel flow feedback system of claim 4, comprising a bypass valve and a pump located upstream of the fuel metering valve, wherein the bypass valve discharges the fuel to a line that feeds into the pump.

7. The metered fuel flow feedback system of claim 6, comprising a system pressurizing valve downstream of the flow measuring system.

8. The metered fuel flow feedback system of claim 7, wherein the pump is fed fuel from a boost pump.

9. The metered fuel flow feedback system of claim 8, wherein the boost pump pressurizes the system pressurizing valve.

10. The fuel system of claim 1, wherein the controller is configured to use a measured stroke of the fuel metering valve and a lookup table to estimate a desired stroke of the fuel metering valve to effectuate a desired flow if the flow measuring system fails or is deactivated.

11. A fuel system for an engine, the fuel system comprising:
a fuel metering valve operable to meter a flow rate of fuel based on a stroke of the fuel metering valve;
a flow sensing valve, downstream of the fuel metering valve, configured to measure a mass flow rate of the fuel leaving the fuel system at a bandwidth greater than 20 Hz by limiting a spring rate of a loading spring of the flow sensing valve to less than 25% of a preload of the loading spring;
a controller in communication with the fuel metering valve and the flow sensing valve, wherein the controller is configured to dynamically adjust the stroke of the fuel metering valve based on the mass flow rate of the fuel measured by the flow sensing valve to change the flow rate of the fuel.

12. The fuel system of claim 11, wherein the fuel metering valve is connected to a linear variable differential transformer that communicates information regarding a position of a piston in the fuel metering valve to the controller.

13. The fuel system of claim 12, comprising an electrohydraulic servo valve that is in communication with the controller and that operates the fuel metering valve, wherein the controller is configured to adjust the stroke of the fuel metering valve via the electrohydraulic servo valve based at least in part on the information related to the piston.

14. The fuel system of claim 11, comprising a bypass valve and a pump located upstream of the fuel metering valve, wherein the bypass valve discharges fuel to a line that feeds into the pump.

15. The fuel system of claim 14, comprising a system pressurizing valve downstream of the flow sensing valve.

16. The fuel system of claim 15, wherein the pump is fed fuel from a boost pump.

17. The fuel system of claim 16, wherein the boost pump pressurizes the system pressurizing valve.

18. A method for controlling a flow rate of fuel in a fuel system, comprising:
feeding the fuel from a fuel source into a pump in the fuel system;
pumping the fuel from the pump to a fuel metering valve in the fuel system;
measuring, by a flow measuring system comprising a flow meter that is at least one of a flow sensing valve, an ultrasonic flow meter, a turbine flow meter, a target flow meter, an optical meter, or a Coriolis flow meter, a mass flow rate of the fuel in the fuel system, the flow meter operating at a bandwidth greater than 20 Hz;
discharging the fuel from the fuel system; and
dynamically adjusting, by a controller communicatively coupled to the flow measuring system and the fuel metering valve, the flow rate through the fuel metering valve based on the mass flow rate of the fuel measured by the flow measuring system.

19. The method of claim 18, wherein the controller is configured to operate at a bandwidth greater than 250 Hz.

20. The method of claim 19, wherein the dynamically adjusting the flow rate comprises the controller sending a command to an electrohydraulic servo valve operable to modify a position of a piston of the fuel metering valve.

21. The method of claim 18, wherein the flow meter is the flow sensing valve configured to measure the mass flow rate of the fuel leaving the fuel system at the bandwidth greater than 20 Hz by limiting a spring rate of a loading spring of the flow sensing valve to less than 25% of a preload of the loading spring.

* * * * *